United States Patent
Dreher et al.

(10) Patent No.: US 8,290,136 B2
(45) Date of Patent: Oct. 16, 2012

(54) CONFERENCE MATERIAL BOT METHOD AND APPARATUS

(75) Inventors: Lori Dreher, Westborough, MA (US); Ronald J. Fernandez, Palo Alto, CA (US); Bryan S. Katz, Freehold, NJ (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 613 days.

(21) Appl. No.: 12/570,727

(22) Filed: Sep. 30, 2009

(65) Prior Publication Data
US 2011/0075830 A1    Mar. 31, 2011

(51) Int. Cl.
*H04M 3/42* (2006.01)
(52) U.S. Cl. .................................. 379/202.01
(58) Field of Classification Search ............... 348/14.08, 348/14.09; 370/260, 261; 379/202.01; 455/416
See application file for complete search history.

(56) References Cited

U.S. PATENT DOCUMENTS

| | | | |
|---|---|---|---|
| 6,044,387 A * | 3/2000 | Angiulo et al. .............. | 715/257 |
| 2003/0106018 A1 | 6/2003 | Silverbrook et al. | |
| 2003/0219710 A1 * | 11/2003 | Suiter et al. .................. | 434/350 |
| 2006/0053042 A1 | 3/2006 | Yoshimura et al. | |
| 2008/0101575 A1 * | 5/2008 | Amador et al. ........... | 379/202.01 |
| 2008/0222112 A1 * | 9/2008 | Morales ........................ | 707/3 |
| 2009/0214016 A1 * | 8/2009 | O'Sullivan et al. ...... | 379/202.01 |

FOREIGN PATENT DOCUMENTS

JP    2000099570    *    4/2000

* cited by examiner

*Primary Examiner* — Quynh Nguyen
*Assistant Examiner* — Oleg Asanbayev (57) ABSTRACT

A method comprising establishing, with a telecommunications management system, a first conference call comprising a first caller at a first telecommunications terminal, a second caller at a second telecommunications terminal, and a third caller at a third telecommunications terminal. Once the first conference call is established, the telecommunications management system appraises the first caller's contribution, the second caller's contribution, and the third caller's contribution to the first conference call. The telecommunications management system receives a request to set-up a second conference call and establishes the second conference call, wherein the telecommunications management system decides whether to include the first caller, the second caller, and the third caller in the second conference call based, at least in part, on the telecommunications management system's appraisal of the first caller's contribution, the second caller's contribution, and the third caller's contribution to the first conference call.

9 Claims, 5 Drawing Sheets

CONFERENCE MATERIAL BOT METHOD AND APPARATUS

FIELD OF THE INVENTION

The present invention relates to telecommunications in general, and, more particularly, an improved method and system to setting-up conference calls.

BACKGROUND OF THE INVENTION

A conference call such as a telephone conference, a video conference, a web conference, etc. is a low-cost alternative for allowing two or more people to communicate with one another in a single place at a single time. But how does a person set-up a conference call?

A person can set-up a conference call via a user interface. This person setting-up the conference call is referred to as a host. Some questions the host may have during the initial set-up of the conference call are, for example:
  i. "who to invite to the conference call?"
  ii. "how to contact and notify the participants regarding the conference call?" and
  iii. "what conference call materials should be reviewed prior to the commencement of the conference call?"

In deciding who to invite to the conference call, often times it is difficult for the host to determine if a person will actively contribute to the discussion of the conference call. In this example, if a person invited to the conference call is simply listening to other participants and not contributing to the discussion of the conference call, the productivity of the conference call is diminished.

In another example, to notify the participants regarding the conference call, the host must provide, for example, the e-mail address, office telephone number, cell phone, etc. of each participant via the user interface. In most situations, when the host is setting-up the conference call, the host provides an e-mail address of each participant as the media format for notifying the participants regarding the date, time, topic, etc. of the conference call. This is inefficient when a participant does not regularly check his/her e-mail. In this example, productivity of the conference call is diminished if the participant does not attend the conference call.

In another example, when the host requires that certain conference call materials be reviewed prior to the commencement of the conference call, the host can provide via the user interface, one or more documents that a participant should read or annotate in preparing for the conference call. Once the conference call is set-up, and, if the host has forgotten to include other conference call materials that are essential to the preparation of the conference call, the host must distribute the other conference call materials via a separate notification (e.g., e-mail, instant message, short-message service, etc.). By not having a system that queries the host for conference call materials, valuable time is wasted because a separate notification must be used to distribute the other conference call materials that are essential to the discussion of the conference call.

Therefore, there exists a need for a method and system that can appraise and measure a caller's contribution during a first conference call to set-up a second conference call, and, a method and system that can efficiently assist a person in setting-up one or more conference calls.

SUMMARY OF THE INVENTION

The present invention provides a telecommunications management system that avoids some of the costs and disadvantages associated with the systems of the prior art.

When the telecommunications management system of the present invention establishes a first conference call between a first caller at a first telecommunications terminal, a second caller at a second telecommunications terminal, and a third caller at a third telecommunications terminal, the telecommunications management system will appraise:
  i. the first caller's contribution to the first conference call,
  ii. the second caller's contribution to the first conference call, and
  iii. the third caller's contribution to the first conference call.

For example, and without limitation, the telecommunications management system may appraise a caller's contribution to the first conference call by measuring the duration of time that a caller speaks during the first conference call.

When a request to set-up a second conference call is received at the telecommunications management system, the telecommunications management system decides whether to include the first caller, the second caller, and the third caller in the second conference call based, at least in part, on the telecommunications management system's appraisal of:
  i. the first caller's contribution to the first conference call (i.e., the duration of time the first caller speaks during the first conference call),
  ii. the second caller's contribution to the first conference call (i.e., the duration of time the second caller speaks during the first conference call), and
  iii. the third caller's contribution to the first conference call (i.e., the duration of time the third caller speaks during the first conference call).

After deciding whether to include the first caller, the second caller, or the third caller in the second conference call, the telecommunications management system transmits a message to each caller of the second conference call based, at least in part, on a profile associated with each caller. Each caller's profile comprises, for example and without limitation, a caller's preferences for receiving the message from the telecommunications management system.

The illustrative embodiment of the present invention comprises: (i) establishing, with a telecommunications management system, a first conference call comprising a first caller at a first telecommunications terminal, (ii) appraising, with the telecommunications management system, the first caller's contribution to the first conference call, (iii) receiving, at the telecommunications management system, a request to set-up a second conference call, and (iv) establishing, with the telecommunications management system, a second conference call, wherein the telecommunications management system decides whether to include the first caller in the second conference call based, at least in part, on the telecommunications management system's appraisal of the first caller's contribution to the first conference call.

DETAILED DESCRIPTION

Figure 1:
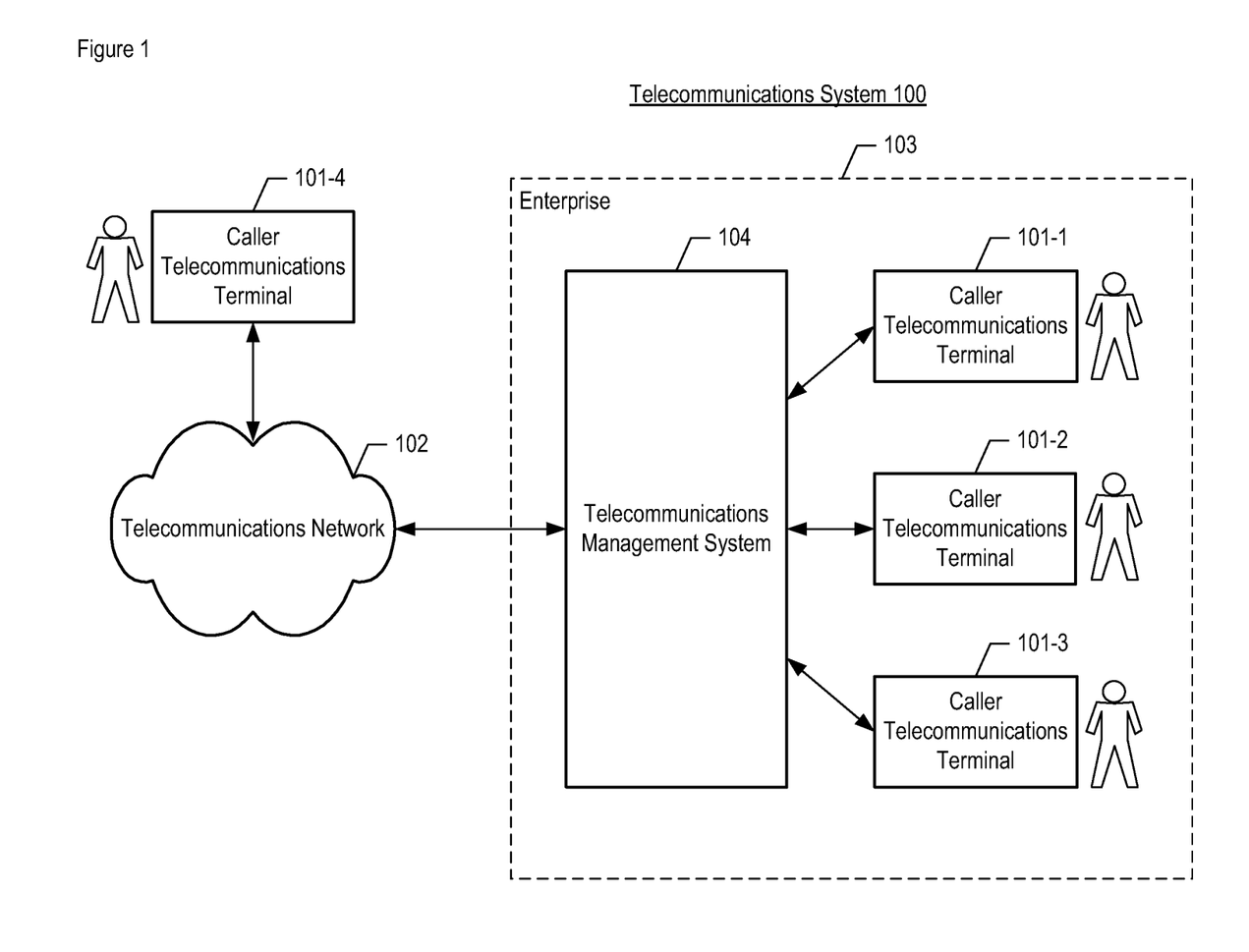
FIG. 1 depicts a schematic diagram of the salient components of telecommunications systems 100 in accordance with the illustrative embodiment of the present invention.

FIG. 1 depicts a schematic diagram of the salient components of telecommunications systems 100 in accordance with the illustrative embodiment of the present invention. Telecommunications system 100 comprises: caller telecommunications terminal 101-1 through 101-4, telecommunications network 102, enterprise 103, and telecommunications management system 104, interconnected as shown.

Although the illustrative embodiment comprises four caller telecommunications terminals 101-1 through 101-4, it will be clear to those skilled in the art, after reading this disclosure, how to make and use alternative embodiments of the present invention that comprises any number of caller telecommunications terminals (e.g., five caller telecommunications terminals, six caller telecommunications terminals, seven caller telecommunications terminals, etc.).

Although the illustrative embodiment comprises one telecommunications network 102, it will be clear to those skilled in the art, after reading this disclosure, how to make and use alternative embodiments of the present invention that comprises any number and combination of telecommunications networks.

Although the illustrative embodiment comprises one enterprise 103, it will be clear to those skilled in the art, after reading this disclosure, how to make and use alternative embodiments of the present invention that comprises any number of enterprises (e.g., two enterprises, three enterprises, four enterprises, etc.)

Although the illustrative embodiment comprises one telecommunications management system 104, it will be clear to those skilled in the art, after reading this disclosure, how to make and use alternative embodiments of the present invention that comprises any number or any combination of telecommunications management systems.

Caller telecommunications terminal $C_i$, wherein i$\in$ {1, 2, 3, 4}, comprises hardware and software that enables a caller to contact and interact with:
  i. enterprise 103,
  ii. telecommunications management system 104,
  iii. caller telecommunications terminal 101-1,
  iv. caller telecommunications terminal 101-2,
  v. caller telecommunications terminal 101-3, and
  vi. caller telecommunications terminal 101-4,
through telecommunications network 102.

In accordance with the illustrative embodiment, caller telecommunications terminal 101-$i$ are wireless telecommunications terminals (e.g., a cell phone, a personal digital assistant, a smart-phone, etc.), but it will be clear to those skilled in the art, after reading this disclosure, how to make and use alternative embodiments of the present invention in which some or all of the caller telecommunications terminals connect to telecommunications network 102 via wireline (e.g., an office deskset, a desktop, a computer, etc.)

Additionally, it will be clear to those skilled in the art, after reading this disclosure, how to make and use alternative embodiments of the present invention in which caller telecommunications terminal 101-$i$ enables a caller to contact enterprise 103 and telecommunications management system 104 via a different modality, for example, and without limitation, web requests, e-mail, instant messaging, short-message service, video, etc. In any case, it will be clear to those skilled in the art how to make and use caller telecommunications terminal 101-$i$.

Telecommunications network 102 is the Public Switched Telephone Network (PSTN), but it will be clear to those skilled in the art, after reading this disclosure, how to make and use alternative embodiments of the present invention in which telecommunications network 102 is a different network or a combination of different networks (e.g., the Internet, a private data network, a satellite network, etc.)

Enterprise 103 is a building for housing caller telecommunications terminal 101-1 through caller telecommunications 101-3, a caller associated with caller telecommunications terminal 101-1 through caller telecommunications 101-3, and telecommunications management system 104. In accordance with the illustrative embodiment, caller telecommunications terminal 101-1 through caller telecommunications 101-3 are co-located with telecommunications management system 104 in enterprise 103, but it will be clear to those skilled in the art, after reading this disclosure, how to make and use alternative embodiments of the present invention in which some or all of the caller telecommunications terminals 101-1 through caller telecommunications terminal 101-3 are not co-located with the telecommunications management system 104.

Telecommunications management system 104 comprises hardware and software to:
  i. receive a request to set-up one or more conference calls from a caller or caller telecommunications terminal 101-$i$,
  ii. establish one or more conference calls (e.g., a first conference call, a second conference call, a third conference call, etc.) on a teleconferencing bridge,
  iii. connect caller telecommunications terminal 101-$i$ to a teleconferencing bridge,
  iv. appraise a caller's contribution to a conference call,
  v. decide whether to include a caller in a conference call based, at least in part, on the telecommunications management system 104's appraisal of the caller's contribution to another conference call,
  vi. query a caller to provide information to set-up a conference call,
  vii. set-up a conference call based, at least in part, on information received from a caller,
  viii. transmit a message (e.g., reminders, agendas, conference call documents, etc.) to a caller of a caller telecommunications terminal 101-$i$ based, at least in part, on a profile associated with the caller, and
  ix. selectively transmit a message (e.g., confidential documents, etc.) to a caller of a caller telecommunications terminal 101-$i$ based, at least in part, on a profile associated with the caller setting-up the conference call.
In particular, telecommunications management system 104 is capable of performing the tasks described below and in the accompanying figures.

Figure 2:
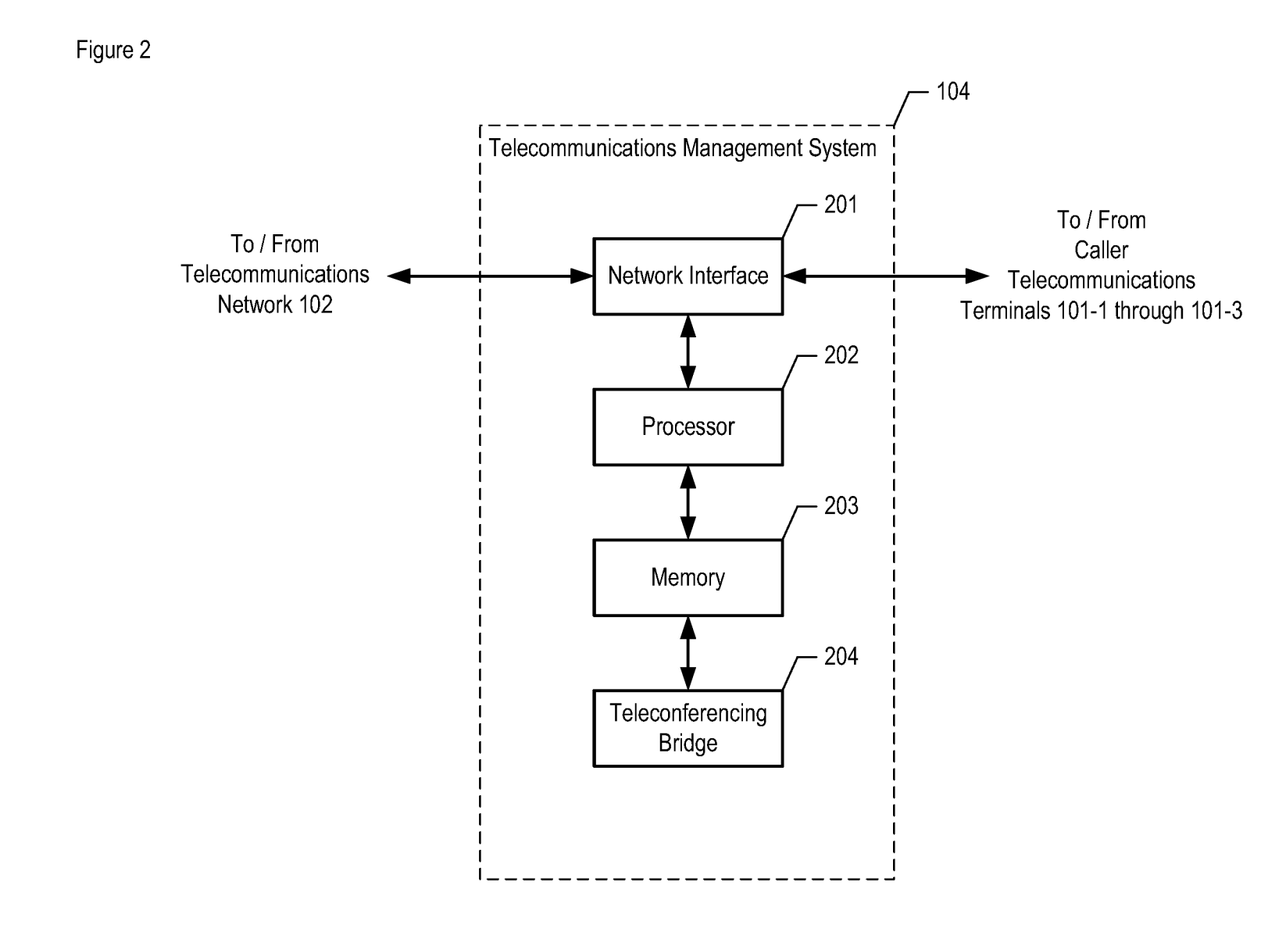
FIG. 2 depicts the salient components of telecommunications management system 104.

FIG. 2 depicts the salient components of telecommunications management system 104.

Telecommunications management system 104 comprises: network interface 201, processor 202, memory 203, and teleconferencing bridge 204, interconnected as shown. It will be clear to those skilled in the art, after reading this disclosure, how to make and use alternative embodiments of the present invention in which telecommunications management system 104 comprises any subcombination of the components listed above.

Network interface 201 comprises the circuitry that enables the telecommunications management system 104 to receive signals from and transmit signals to any telecommunications terminal such as caller telecommunications terminal 101-$i$ in well-known fashion.

Processor 202 is a general-purpose processor that is capable of receiving information from and transmitting information to network interface 201, executing instructions stored in memory 203 including the instructions that correspond to the tasks of the illustrative embodiment, and reading data from and writing data into memory 203. In some alternative embodiments of the present invention, processor 202 is special-purpose processor.

Memory 203 stores the instructions and data used by processor 202, in well-known fashion. Memory 203 can be any combination of dynamic random-access memory (RAM), flash memory, disk drive memory, and so forth. In particular, memory 203 stores the instructions and data used by processor 202 for performing the tasks described below and in the accompanying figures.

Teleconferencing bridge 204 comprises hardware and software that enables caller telecommunications terminals 101-1 through caller telecommunications terminal 101-4 to connect and communicate with one another. At designated times, telecommunications management system 104 is configured to set up one or more teleconferencing bridges to allow multiple caller telecommunications terminals to connect with one another. Additionally, telecommunications management system 104 is configured to schedule more than one conference call on the same teleconferencing bridge at the same time. These teleconferencing bridges can host conference calls with as few as two people, with no pre-set upper limit on the number of caller telecommunications terminals in a conference call. Furthermore, these teleconferencing bridges can be part of or, separate from, the telecommunications management system 104. It will be clear to those skilled in the art, after reading this disclosure, how to make and use teleconferencing bridge 204.

Figure 3:
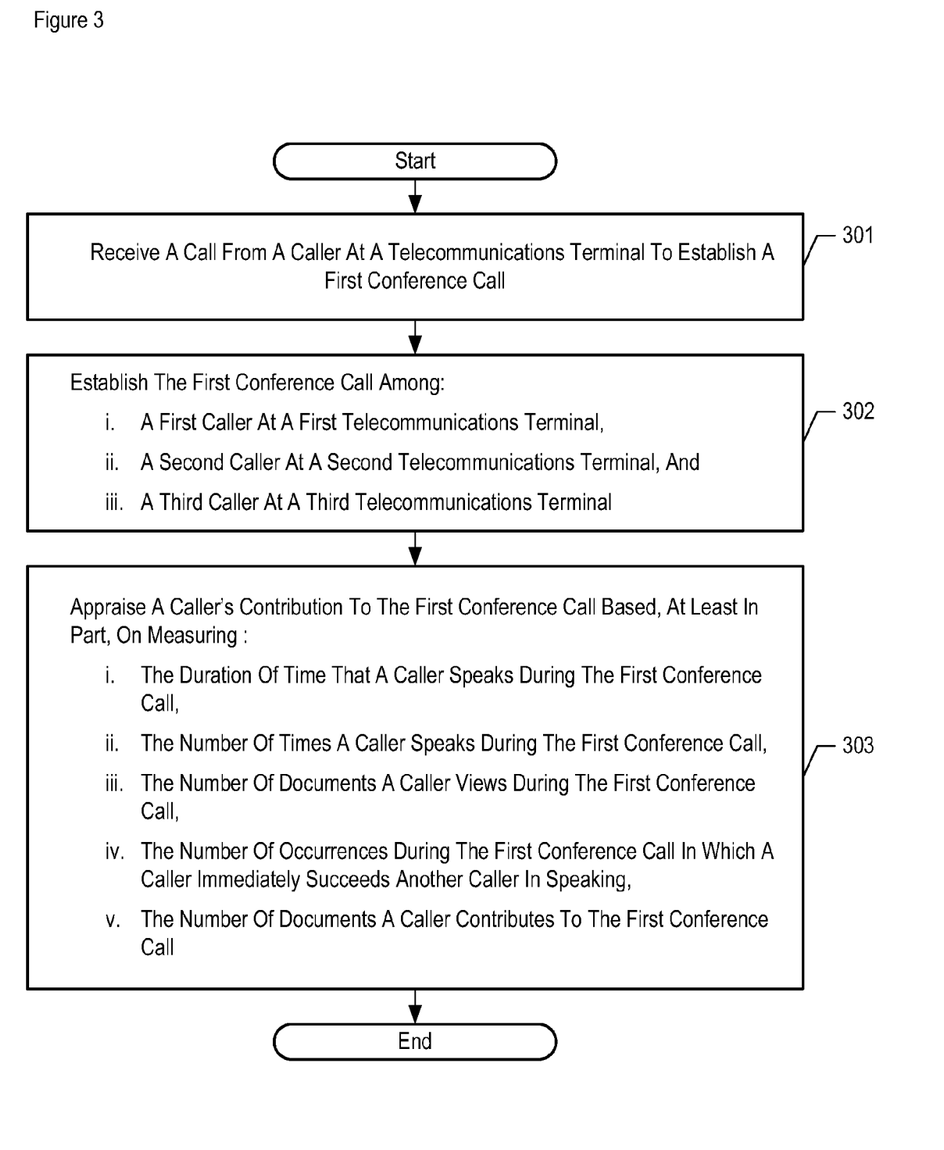
FIG. 3 depicts a flowchart of the salient tasks associated with the operation of the illustrative embodiment of the present invention for establishing a first conference call and collecting indications of a caller's contribution to the first conference call.

FIG. 3 depicts a flowchart of the salient tasks associated with the operation of the illustrative embodiment of the present invention.

It will be clear to those skilled in the art, after reading this disclosure, how to make and use alternative embodiments of the present invention in which tasks 301, 302, and 303 are performed in a different order or are performed concurrently. Furthermore, it will be clear to those skilled in the art, after reading this disclosure, how to make and use alternative embodiments of the present invention that omit one or more tasks 301, 302, and 303.

At task 301, the telecommunications management system 104 receives a call from:
  i. a first caller at a first telecommunications terminal 101-1,
  ii. a second caller at a second telecommunications terminal 101-2, and
  iii. a third caller at a third telecommunications terminal 101-3 to establish a first conference call.

It will be clear to those skilled in the art, after reading this disclosure, how to make and use alternative embodiments of the present invention in which the order of receiving a call at the telecommunications management system 104 to establish the first conference call can be in a different order than described above.

At task 302, the telecommunications management system 104 establishes the first conference call comprising:
  i. the first caller at the first telecommunications terminal 101-1,
  ii. the second caller at the second telecommunications terminal 101-2, and
  iii. the third caller at the third telecommunications terminal 101-3.

It will be clear to those skilled in the art, after reading this disclosure, how to make and use alternative embodiments of the present invention in which the telecommunications management system 104 establishes the first conference call with more than three callers and the telecommunications terminals associated with the callers.

At task 303, the telecommunications management system 104 appraises:
  i. the first caller's contribution to the first conference call,
  ii. the second caller's contribution to the first conference call, and
  iii. the third caller's contribution to the first conference call upon commencement of the first conference call.

In accordance with the illustrative embodiment, the telecommunications management system 104 appraises the contribution of the callers in the first conference call by measuring, for example, and without limitation:
  i. the duration of time the a caller speaks during the first conference call, or
  ii. the number of times a caller speaks during the first conference call, or
  iii. the number of documents a caller views during the first conference call, or
  iv. the number of occurrences during the first conference call in which a caller immediately succeeds another caller in speaking, or
  v. the number of documents a caller contributes to the first conference call, or
  vi. any combination of i, ii, iii, iv, and v.

With respect to the duration of time a caller speaks during the first conference call, the telecommunications management system 104 appraises and measures:
  i. the duration of time the first caller speaks during the first conference call, or
  ii. the duration of time the second caller speaks during the first conference call, or
  iii. the duration of time the third caller speaks during the first conference call, or
  iv. any combination of i, ii, and iii.

The duration of time a caller speaks during the first conference call is described in detail below and with respect to Table 1 and FIG. 4.

With respect to the number of times a caller speaks during the first conference call, the telecommunications management system 104 appraises and measures:
  i. the number of times the first caller speaks during the first conference call, or
  ii. the number of times the second caller speaks during the first conference call, or
  iii. the number of times the third caller speaks during the first conference call, or
  iv. any combination of i, ii, and iii.

The number of times a caller speaks during the first conference call is described in detail below and with respect to Table 2 and FIG. 4.

With respect to the number of documents a caller views during the first conference call, the telecommunications management system 104 appraises and measures:
  i. the number of documents the first caller views during the first conference call, or
  ii. the number of documents the second caller views during the first conference call, or
  iii. the number of documents the third caller views during the first conference call, or
  iv. any combination of i, ii, and iii.

The number documents a caller views during the first conference call can be, for example, and without limitation, the number of times a caller accesses a data repository to retrieve documents to read during the first conference call.

It will be clear to those skilled in the art, after reading this disclosure, how to make and use alternative embodiments of the present invention in which the number documents a caller views during the first conference call can be, for example, and without limitation, the number of times a caller invokes a hyperlink, a URL, a web page, a sharepoint, etc. to retrieve documents to read during the first conference call.

With respect to the number of occurrences during the first conference call in which a caller immediately succeeds another caller in speaking, the telecommunications management system 104 appraises and measures:

i. the number of occurrences during the first conference call in which the first caller immediately succeeds the second caller in speaking, or ii. the number of occurrences during the first conference call in which the first caller immediately succeeds the third caller in speaking, or iii. the number of occurrences during the first conference call in which the second caller immediately succeeds the first caller in speaking, or iv. the number of occurrences during the first conference call in which the second caller immediately succeeds the third caller in speaking, or v. the number of occurrences during the first conference call in which the third caller immediately succeeds the first caller in speaking, or vi. the number of occurrences during the first conference call in which the third caller immediately succeeds the second caller in speaking, or vii. any combination of i, ii, iii, iv, v, and vi.

The number of times a caller speaks during the first conference call is described in detail below and with respect to Table 3 and FIG. 4.

With respect to the number of documents a caller contributes to the first conference call, the telecommunications management system 104 appraises and measures:

i. the number of documents the first caller contributes to the first conference call, or ii. the number of documents the second caller contributes to the first conference call, or iii. the number of documents the third caller contributes to the first conference call, or iv. any combination of i, ii, and iii.

The number documents a caller contributes during the first conference call can be, for example, and without limitation, the number of hyperlinks, URLs, web pages, power-point slides, etc. a caller distributes to other callers of the first conference call during or before the first conference call.

In accordance with the illustrative embodiment, the telecommunications management system 104 appraises the contribution of the callers by measuring (i) through (v), but it will be clear to those skilled in the art, after reading this disclosure, how to make and use alternative embodiments of the present invention in which the telecommunications management system 104 appraises the contribution of the callers by measuring one caller contribution or any combination of (i) through (v).

Figure 4:
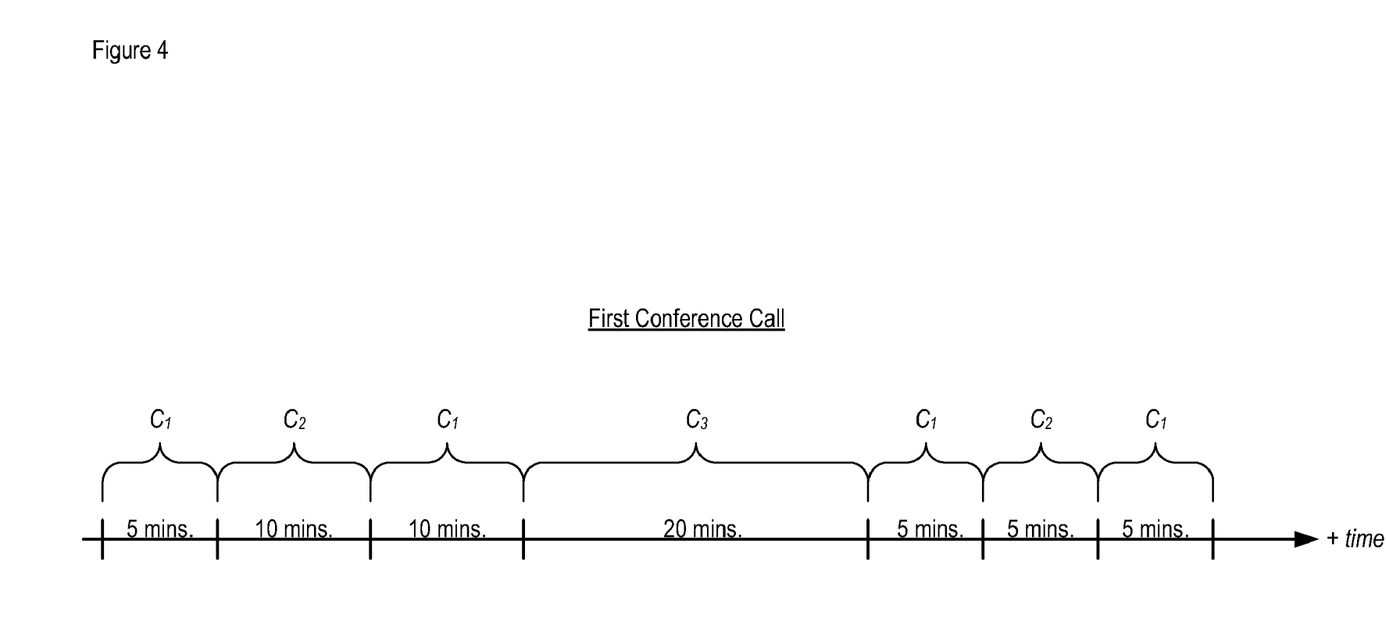
FIG. 4 is an illustrative timeline of the salient tasks associated with the operation of the illustrative embodiment of the present invention for appraising and measuring the a caller's contribution to a conference call.

FIG. 4 is an illustrative timeline of the salient tasks associated with the operation of the illustrative embodiment of the present invention for appraising and measuring the a caller's contribution to a conference call.

In accordance with FIG. 4, the telecommunications management system 104 appraises the first caller's contribution, the second caller's contribution, and the third caller's contribution to the first conference call by measuring the:

i. the duration of time the first caller speaks during the first conference call, ii. the duration of time the second caller speaks during the first conference call, and iii. the duration of time the third caller speaks during the first conference call.

Table 1 illustrates the duration of time a caller speaks during the first conference call.

TABLE 1

Duration of Time A Caller Speaks During The First Conference Call

| Caller | Conference Call Duration | Duration of Time Caller Speaks | Percentage |
|---|---|---|---|
| First Caller At First Telecommunications Terminal | 60 minutes | 25 minutes | 41.66% |
| Second Caller At Second Telecommunications Terminal | 60 minutes | 15 minutes | 25% |
| Third Caller At Third Telecommunications Terminal | 60 minutes | 20 minutes | 33.33% |

With respect to the first caller, the telecommunications management system 104 determines that:

i. the duration of the first conference call is 60 minutes, and measures that:

ii. the duration of time the first caller speaks during the first conference call is 25 minutes.

Based at least in part on the duration of time the first caller speaks during the first conference call (i.e., 25 minutes), the telecommunications management system 104 performs the following calculations:

$$25 \text{ minutes} \div 60 \text{ minutes} = 0.4166$$

$$0.4166 \times 100 = 41.66\%$$

Thus, based on this calculation, the telecommunications management system 104 appraises and measures that the duration of time the first caller speaks during the first conference call is 41.66%.

Additionally, the telecommunications management system determines that:

i. the duration of the first conference call is 60 minutes, and measures that:

ii. the duration of time the second caller speaks during the first conference call is 15 minutes.

Based at least in part on the duration of time the second caller speaks during the first conference call (i.e., 15 minutes), the telecommunications management system 104 performs the following calculations:

$$15 \text{ minutes} \div 60 \text{ minutes} = 0.25$$

$$0.25 \times 100 = 25\%$$

Thus, based on this calculation, the telecommunications management system 104 appraises and measures that the duration of time the second caller speaks during the first conference call is 25%.

Additionally, the telecommunications management system 104 determines that:

i. the duration of the first conference call is 60 minutes, and measures that:

ii. the duration of time the second caller speaks during the first conference call is 20 minutes.

Based at least in part on the duration of time the third caller speaks during the first conference call (i.e., 20 minutes), the telecommunications management system 104 performs the following calculations:

20 minutes÷60 minutes=0.33

0.33×100=33.33%

Thus, based on this calculation, the telecommunications management system 104 appraises and measures that the duration of time the third caller speaks during the first conference call is 33.33%.

Therefore, based at least in part on the telecommunications management system 104's appraisal and measurements of the first caller's contribution, the second caller's contribution, and the third caller's contribution to the first conference call, the telecommunications management system 104 appraises and measures that the first caller's duration of speaking is greater than the second caller's duration of speaking and the third caller's duration of speaking.

In accordance with FIG. 4, the telecommunications management system 104 appraises the first caller's contribution, the second caller's contribution, and the third caller's contribution to the first conference call by measuring the:
  i. the number of times the first caller speaks during the first conference call,
  ii. the number of times the second caller speaks during the first conference call,
  iii. the number of times the third caller speaks during the first conference call, and Table 2 illustrates the number of times a caller speaks after another caller speaks during the first conference call.

TABLE 2

Number of Times A Caller Speaks During The First Conference Call

| First Caller Speaks | Second Caller Speaks | Third Caller Speaks |
|---|---|---|
| 4 | 2 | 1 |

Therefore, based at least in part on the telecommunications management system 104's appraisal and measurements of the first caller's contribution, the second caller's contribution, and the third caller's contribution to the first conference call, the telecommunications management system 104 appraises and measures that the number of times the first caller speaks is greater than the second caller and the third caller.

In accordance with FIG. 4, the telecommunications management system 104 appraises the first caller's contribution, the second caller's contribution, and the third caller's contribution to the first conference call by measuring the:
  i. the number of occurrences during the first conference call in which the first caller immediately succeeds the second caller in speaking, or
  ii. the number of occurrences during the first conference call in which the first caller immediately succeeds the third caller in speaking, or
  iii. the number of occurrences during the first conference call in which the second caller immediately succeeds the first caller in speaking, or
  iv. the number of occurrences during the first conference call in which the second caller immediately succeeds the third caller in speaking, or
  v. the number of occurrences during the first conference call in which the third caller immediately succeeds the first caller in speaking, or
  vi. the number of occurrences during the first conference call in which the third caller immediately succeeds the second caller in speaking.

Table 3 illustrates the number of occurrences during the first conference call in which a caller immediately succeeds another caller in speaking.

TABLE 3

Number of Occurrences During The First Conference Call In Which A Caller Immediately Succeeds Another Caller In Speaking

| Caller Speaks | Number of Occurrence First Caller Succeeds | Number of Occurrence Second Caller Succeeds | Number of Occurrence Third Caller Succeeds |
|---|---|---|---|
| First Caller Speaks | N/A | 2 | 1 |
| Second Caller Speaks | 2 | N/A | 0 |
| Third Caller Speaks | 1 | 0 | N/A |

With respect to the number of occurrences during the first conference call in which the first caller immediately succeeds another caller in speaking, the telecommunications management system 104 appraises and measures that:
  i. the first caller immediately succeeds in speaking two times after the second caller speaks during the first conference call, and
  ii. the first caller immediately succeeds in speaking once after the third caller speaks during the first conference call.

With respect to the number of occurrences during the first conference call in which the second caller immediately succeeds another caller in speaking, the telecommunications management system 104 appraises and measures that:
  i. the second caller immediately succeeds in speaking two times after the first caller speaks during the first conference call, and
  ii. the second caller immediately succeeds in speaking zero times after the third caller speaks during the first conference call.

With respect to the number of occurrences during the first conference call in which the third caller immediately succeeds another caller in speaking, the telecommunications management system 104 appraises and measures that:
  i. the third caller immediately succeeds in speaking once after the first caller speaks during the first conference call, and
  ii. the third caller immediately succeeds in speaking zero times after the second caller speaks during the first conference call.

In accordance with the illustrative embodiment, the appraisal and measurement of the number of occurrences during the first conference call in which a caller immediately succeeds another caller in speaking is advantageous in the situation where a caller asks a question and another answers the question. The telecommunications management system 104 can infer from this appraisal and measurement that the caller answering the question is knowledgeable in the topic of the first conference call.

Figure 5:
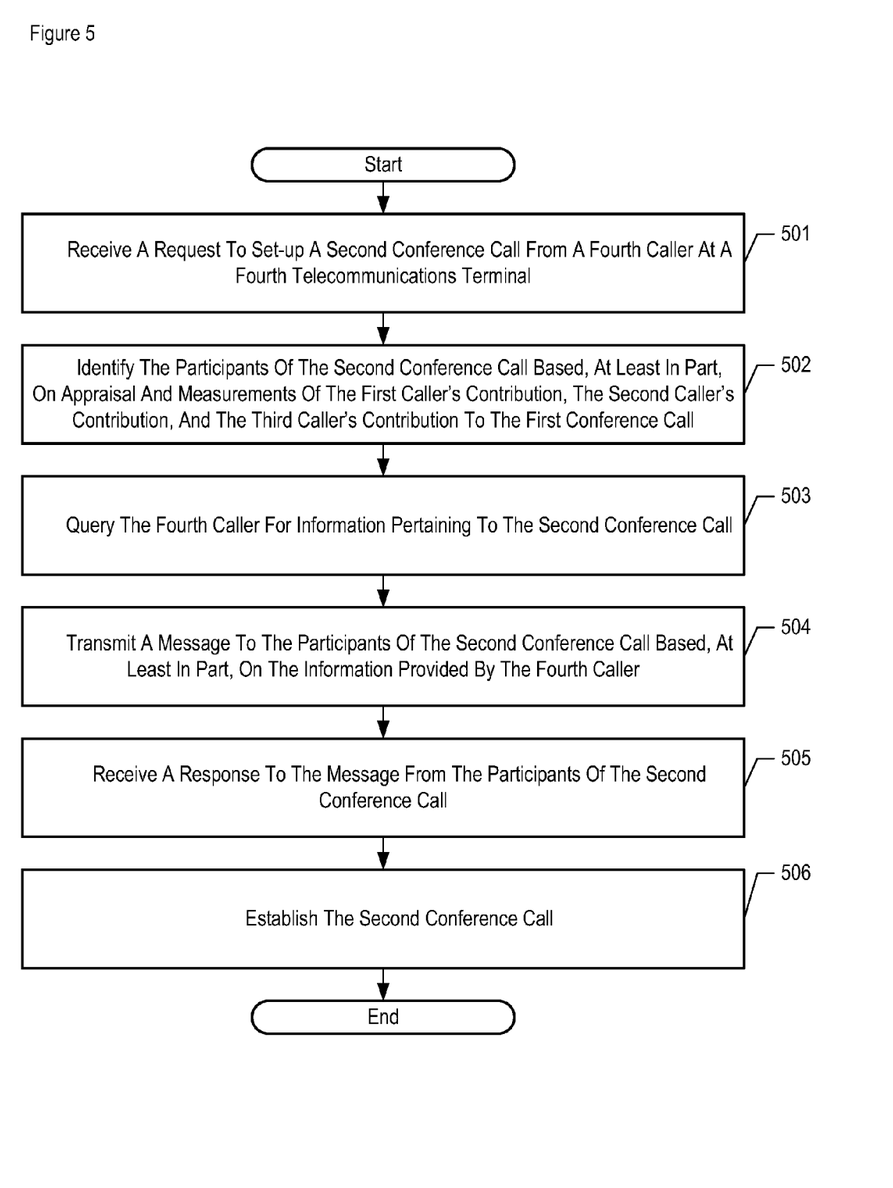
FIG. 5 depicts a flowchart of the salient tasks associated with the operation of the illustrative embodiment of the present invention for setting-up a second conference call.

FIG. 5 depicts a flowchart of the salient tasks associated with the operation of the illustrative embodiment of the present invention for setting-up a second conference call.

It will be clear to those skilled in the art, after reading this disclosure, how to make and use alternative embodiments of the present invention in which tasks 501, 502, 503, 504, 505, and 506 are performed in a different order or are performed concurrently. Furthermore, it will be clear to those skilled in the art, after reading this disclosure, how to make and use alternative embodiments of the present invention that omit one or more tasks 501, 502, 503, 504, 505, and 506.

At task 501, the telecommunications management system 104 receives a request to set-up a second conference call from a fourth caller at a fourth telecommunications terminal 101-4.

In accordance with the illustrative embodiment, the initial set-up of the second conference call begins by:
  i. inputting the topic of the second conference call, or
  ii. inputting a person's e-mail address, or
  iii. a combination of i and ii into a user interface displayed on the fourth telecommunications terminal 101-4. Each of these information are used alone or in combination with one another by the telecommunications management system 104 to identify the first conference call so that the telecommunications management system 104 can decide whether to include the first caller, the second caller, and the third caller of the first conference call into the second conference call, which will be described below and with respect to task 502.

Once the fourth caller has input the topic of the second conference call or a person's e-mail address, a request to set-up the second conference call is transmitted from the fourth telecommunications terminal 101-4 to the telecommunications management system 104 through network 102.

It will be clear to those skilled in the art, after reading this disclosure, how to make and use alternative embodiments of the present invention in which the second conference call can be set-up by transmitting the request via e-mail, short-message service, instant-message, video, voice, etc.

Additionally, it will be clear to those skilled in the art after reading this disclosure, how to make and use alternative embodiments of the present invention in which the fourth telecommunications terminal 101-4 transmits concurrently, simultaneously, or separately the request to set-up the second conference call, the topic of the second conference call, and a person's e-mail to the telecommunications management system 104.

At task 502, the telecommunications management system 104 determines that the topic included in the request is similar to the first conference call. Upon this determination, the telecommunications management system 104 decides whether to include at least one caller from the first conference call into the second conference call.

In accordance with the illustrative embodiment, the telecommunications management system 104 decides to include the first caller from the first conference call into the second conference call. This decision performed by the telecommunications management system 104 is based, at least in part, on the first caller's contribution, the second caller's contribution, and the third caller's contribution appraised and measured by the telecommunications management system 104 at task 303.

In accordance with the illustrative embodiment, the appraisal and the measurement of a caller's contribution to the first conference call is performed after the first conference call completes and before receiving the request to set-up the second conference call, but it will be clear to those skilled in the art, after reading this disclosure, how to make and use alternative embodiments of the present invention in which data pertaining to the first caller's contribution, the second caller's contribution, and the third caller's contribution to the first conference call are stored in memory 204 and analyzed by the telecommunications management system 104 upon receiving the request to set-up the second conference call from the fourth telecommunications terminal 101-4.

For example, data pertaining to the first caller's contribution, the second caller's contribution, and the third caller's contribution to the first conference call are stored in memory 204. Upon receiving the request to set-up the second conference call from the fourth telecommunications terminal 101-4, which includes the topic of the second conference call, the telecommunications management system 104 determines that the topic of the second conference call is similar to the topic of the first conference call. The telecommunications management system 104 analyzes the data stored in memory 204 and decides whether to include at least one caller from the first conference call into the second conference call.

Alternatively, the e-mail address of the person can be used to identify the first conference call so that the telecommunications management system 104 can decide whether to include first caller, the second caller, and the third caller of the first conference call into the second conference call.

For example, Bryan is a co-inventor with three other inventors (i.e., the first caller, the second caller, and the third caller). The fourth caller would like to set-up a conference call (i.e., the second conference call) with Bryan to discuss his invention. The fourth caller inputs Bryan's e-mail address via the user interface and transmits a request to the telecommunications management system 104 to set-up the second conference call.

Upon receiving the request, the telecommunications management system 104 searches memory 204 using Bryan's e-mail address to determine whether there are any other co-inventors associated with Bryan's invention. The telecommunications management system 104 determines that there are three other co-inventors associated with Bryan's invention, which in this example are the first caller, the second caller, and the third caller.

The telecommunications management system 104 also determines from the search that first caller, the second caller, and the third caller were previously in a first conference call. The telecommunications management system 104 decides whether to include the first caller, the second caller, and the third caller into the second conference call based, at least in part, on the telecommunications management system 104's appraisal and measurement of the first caller's contribution, the second caller's contribution, and the third caller's contribution to the first conference performed at task 303.

Based at least in part on the telecommunications management system 104's appraisal and measurements performed at task 303, the telecommunications management system 104 decides to include the first caller in the second conference call set-up by the fourth caller at the fourth telecommunications terminal 101-4.

At task 503, the telecommunications management system 104 queries the fourth caller at the fourth telecommunications terminal 101-4 for information pertaining to the second conference call after deciding to include the first caller in the second conference call. In response to the telecommunications management system 104's query, the fourth caller provides, for example, and without limitation:
  i. the time, date, and location of the second conference call, or
  ii. the type of conference call (e.g., a telephone conference, a video conference, etc.), or
  iii. conference call materials (e.g., conference call documents, agenda, etc.) for preparing for the second conference call, or iv. the location (e.g., websites, URLs, sharepoint, hyperlinks, etc.) of one or more data repositories that store the conference call materials, or v. any combination of i, ii, iii, and iv.

It will be clear to those skilled in the art, after reading this disclosure, how to make and use alternative embodiments of the present invention in which the telecommunications management system 104 uses, for example, and without limitation:

i. the topic of the second conference call provided by the fourth caller at task 205, or ii. the information provided by the fourth caller in response to the telecommunications management system's query at task 503, or iii. a combination of i and ii, to automatically or dynamically determine other conference call materials that may be relevant or useful for the second conference call. The other conference call materials are, for example, and without limitation:

i. electronic documents used in another conference call that are relevant to the topic of the second conference call, or ii. electronic documents stored in a data repository (e.g., a sharepoint, a database that is co-located or not co-located with the telecommunications management system 104) that were not used in another conference call but are relevant to the topic of the second conference call, or iii. websites, URLs, sharepoint, hyperlinks, etc. used in another conference call that are relevant to the topic of the second conference call, or iv. websites, URLs, sharepoint, hyperlinks, etc. that were not used in another conference call but are relevant to the topic of the second conference call (e.g., websites, URLs, sharepoint, hyperlinks, etc. used as a reference or resource by others to prepare a thesis or publish a document), or v. Internet resources (e.g., websites, URLs, sharepoint, hyperlinks, etc.) that have the same or similar topic as the second conference call, or vi. electronic documents, websites, e-mails, etc., authored by the participants of the second conference call (i.e., participants that the fourth caller has specified during the initial set-up of the second conference call at task 501), or vii. electronic documents, websites, e-mails, etc., authored by the participants of the first conference (i.e., participants that the telecommunications management system 104 decided to include in the second conference call at task 502), viii. annotations made to the electronic documents, websites, e-mails, etc., by the author during a conference call, or ix. any combination or i, ii, iii, iv, v, vi, vii, and ix.

For example, and without limitation, the telecommunications management system 104 uses the topic of the second conference call provided by the fourth caller at task 501 to automatically or dynamically determine that electronic documents stored in a data repository (e.g., sharepoint) is relevant or useful for the second conference call. This is accomplished by the telecommunications management system 104 by, for example, and without limitation, comparing the words in the topic of the second conference call with one or more metadata associated with an electronic document stored in the data repository.

Once the telecommunications management system 104 automatically or dynamically determines that other conference call materials may be relevant or useful for the second conference call, a list of the other conference call materials is transmitted to the fourth caller at the fourth telecommunications terminal 101-4. Upon receiving the list, the fourth caller can make a selection from the list via the user interface so that the selected conference call materials are included and distributed to the participants of the second conference call.

In accordance with the illustrative embodiment, the fourth caller can also set-up the telecommunications management system 104 to, for example, and without limitation:

i. transmit a message to the host and the participants of the second conference call in order to remind them to complete a task before the commencement of the second conference call, or ii. transmit a message to the host and the participants of the second conference call that reminds them about the time, date, and location of the second conference call, or iii. transmit a message to the host and the participants of the second conference call regarding updated conference call materials, or iv. selectively transmit updated conference call materials to the participants of the second conference call, or v. set the privileges of conference call materials (e.g., which participant in the second conference call is permitted to annotate the conference call materials), v. set the privileges of a data repository that stores the conference call materials (e.g., which participant in the second conference call is permitted to access a data repository), vi. any combination of i, ii, iii, iv, and v.

In accordance with the illustrative embodiment, the telecommunications management system 104 queries the fourth caller at the fourth telecommunications terminal 101-4 to provide information pertaining to the second conference call after deciding to include the first caller in the second conference call, but it will be clear to those skilled in the art, after reading this disclosure, how to make and use alternative embodiments of the present invention in which the telecommunications management system 104 can query the fourth caller at the fourth telecommunications terminal 101-4 to provide information pertaining to the second conference call before (i.e., during the fourth caller's initial set-up of the second conference call) or after deciding to include the first caller in the second conference call.

At task 504, the telecommunications management system 104 transmits a message to the first caller and the other participants of the second conference call. The message transmitted to the first caller and the other participants comprises the information provided by the fourth caller via the fourth telecommunications terminal 101-4 at task 503. In other words, the information provided by the fourth caller comprises, for example, and without limitation:

i. the time, date, and location of the second conference call, or ii. the type of conference call (e.g., a telephone conference, a video conference, etc.), or iii. conference call materials (e.g., conference call documents, agenda, etc.) for preparing for the second conference call, or iv. the location (e.g., websites, URLs, sharepoint, hyperlinks, etc.) of one or more data repositories that store the conference call materials, or v. a request that the first caller attend the second conference call, or vi. a list of participants that will be attending the second conference call, or vii. the topic of the second conference call, or viii. a request that the first caller indicate whether he/she will be attending the second conference call, or ix. any combination of i, ii, iii, iv, v, vi, vii, and viii.

In accordance with the illustrative embodiment, this message transmitted to the first caller is based, at least in part, on a profile associated with the first caller. The profile associated with the first caller defines one or more preferences specified by the first caller, which comprise, for example, and without limitation:

i. which telecommunications terminal should the telecommunications management system 104 transmit the message to (e.g., the first caller's cell phone, office phone, home phone, desktop, etc.), or ii. what time should the telecommunications management system 104 transmit the message to the first caller's telecommunications terminal (e.g., between 9 a.m. and 5 p.m. Monday through Friday, between 6 p.m. and 9 p.m. Saturday and Sunday, etc.), or iii. whether the telecommunications management system 104 should transmit the message to a particular printer for printing the conference call materials, or iv. whether the telecommunications management system 104 should transmit the message in a particular media format specified by the first caller (e.g., e-mail, instant message, voice, video, etc.), or v. topics that the first caller is knowledgeable in, or vi. a history of conference calls that the first caller has attended, or vii. the type of conference call (e.g., a voice conference call, a face-to-face conference call, a video conference call, a web conference call, etc.) the first caller prefers to attend, or viii. a history of people that the first caller had a conference call with (e.g., a history of people that the first caller frequently has a conference call with), or ix. any combination of i, ii, iii, iv, v, vi, vii, and viii.

For example, if the first participant can only be contacted via his cell phone between Monday through Friday, and between 9 a.m. and 5 p.m., the telecommunications management system 104 determines that the message should be transmitted to the first caller's cell phone between Monday through Friday, and between 9 a.m. and 5 p.m. prior to the commencement of the second conference call. Additionally, since the telecommunications management system 104 determines that the message should be transmitted to the first caller's cell phone, and, based at least in part on the first participant's cell phone capabilities, the telecommunications management system 104 only transmits relevant portions of a document associated with the second conference call to the first caller's cell phone.

Alternatively, the first participant may have different telecommunications terminals available to him at different locations while, for example, on a business trip. When the first participant is traveling from one location to another location, the telecommunications management system 104 comprises the hardware and software to enable it to only transmit the relevant portions of a document associated with the second conference call to the first participant's cell phone. On the other hand, the telecommunications management system 104 also comprises the hardware and software to enable it to determine the first participant's location, for example, the first participant's hotel. This is accomplished by the telecommunications management system 104 by analyzing a profile associated with the first participant. This is advantageous because the telecommunications management system 104 can query the first participant to inquire whether a portion of the document associated with the second conference call should be transmitted to the first participant's cell phone, or, whether the entire document should be transmitted to the first participant's laptop at the hotel.

At task 505, the telecommunications management system 104 receives a response to the message transmitted to the first caller.

In accordance with the illustrative embodiment, the response from the first caller indicates that he is available to participate in the second conference call. Alternatively, if the response from the first caller indicates that he is not available to participate in the second conference call, a message is transmitted to the second caller based on the fact that the telecommunications management system 104 has previously appraised and measured that the second caller's contribution to the first conference call is greater than the third caller's contribution to the first conference call at task 303.

At task 506, the telecommunications management system 104 establishes the second conference call between the fourth caller at the fourth telecommunications terminal 101-4, the first caller at the first telecommunications terminal 101-1, and the other participants of the second conference call.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   establishing, with a telecommunications management system, a first conference call associated with a first caller at a first telecommunications terminal;
   appraising, with the telecommunications management system, the first caller's contribution to the first conference call to yield an appraisal;
   receiving, at the telecommunications management system, a request to set-up a second conference call; and
   establishing, with the telecommunications management system, the second conference call, wherein the telecommunications management system decides whether to include the first caller in the second conference call based, at least in part, on the appraisal of the first caller's contribution to the first conference call, wherein appraising the first caller's contribution to the first conference call comprises measuring, with the telecommunications management system and during the first conference call:
   the number of occurrences in which the first caller immediately succeeds a second caller in speaking after the second caller finishes speaking;
   a duration of time that the first caller speaks during the first conference call; and
   a number of times the first caller speaks during the first conference call.

2. The method of claim 1 wherein appraising the first caller's contribution to the first conference call comprises:
   measuring, with the telecommunications management system, a number of documents that the first caller contributes to the first conference call.

3. The method of claim 1 wherein appraising the first caller's contribution to the first conference call comprises:
   measuring, with the telecommunications management system, a number of documents that the first caller views during the first conference call.

4. A system comprising:
   a processor; and
   a computer-readable storage medium having stored therein instructions which, when executed by the processor, cause the processor to perform a method comprising:

establishing, with a telecommunications management system, a first conference call associated with a first caller at a first telecommunications terminal;

appraising, with the telecommunications management system, the first caller's contribution to the first conference call to yield an appraisal;

receiving, at the telecommunications management system, a request to set-up a second conference call; and establishing, with the telecommunications management system, the second conference call, wherein the telecommunications management system decides whether to include the first caller in the second conference call based, at least in part, on the appraisal of the first caller's contribution to the first conference call, wherein appraising the first caller's contribution to the first conference call comprises measuring, with the telecommunications management system and during the first conference call:

the number of occurrences in which the first caller immediately succeeds a second caller in speaking after the second caller finishes speaking;

a duration of time that the first caller speaks during the first conference call; and a number of times the first caller speaks during the first conference call.

5. The system of claim 4, wherein appraising the first caller's contribution to the first conference call comprises:

measuring, with the telecommunications management system, a number of documents that the first caller contributes to the first conference call.

6. The system of claim 4, wherein appraising the first caller's contribution to the first conference call comprises:

measuring, with the telecommunications management system, a number of documents that the first caller views during the first conference call.

7. A non-transitory computer-readable storage medium having stored therein instructions which, when executed by a processor, cause the processor to perform a method comprising:

establishing, with a telecommunications management system, a first conference call associated with a first caller at a first telecommunications terminal;

appraising, with the telecommunications management system, the first caller's contribution to the first conference call to yield an appraisal;

receiving, at the telecommunications management system, a request to set-up a second conference call; and establishing, with the telecommunications management system, the second conference call, wherein the telecommunications management system decides whether to include the first caller in the second conference call based, at least in part, on the appraisal of the first caller's contribution to the first conference call, wherein appraising the first caller's contribution to the first conference call comprises measuring, with the telecommunications management system and during the first conference call:

the number of occurrences in which the first caller immediately succeeds a second caller in speaking after the second caller finishes speaking;

a duration of time that the first caller speaks during the first conference call; and a number of times the first caller speaks during the first conference call.

8. The non-transitory computer-readable storage medium of claim 7, wherein appraising the first caller's contribution to the first conference call comprises:

measuring, with the telecommunications management system, a number of documents that the first caller contributes to the first conference call.

9. The non-transitory computer-readable storage medium of claim 7, wherein appraising the first caller's contribution to the first conference call comprises:

measuring, with the telecommunications management system, a number of documents that the first caller views during the first conference call.

* * * * *